United States Patent
Pelham

(10) Patent No.: US 6,446,946 B1
(45) Date of Patent: Sep. 10, 2002

(54) POLISH ROD SPRING II

(76) Inventor: Tony E. Pelham, 609 Husky Apt. B, Bakersfield, CA (US) 93308

( * ) Notice: Subject to any disclaimer, the term of this patent is extended or adjusted under 35 U.S.C. 154(b) by 0 days.

(21) Appl. No.: 09/782,459

(22) Filed: Feb. 13, 2001

(51) Int. Cl.[7] .................................................. F16M 1/00

(52) U.S. Cl. ....................................... 267/137; 267/125

(58) Field of Search ................................ 267/166–180, 267/221, 125, 137, 286

(56) References Cited

U.S. PATENT DOCUMENTS

| | | | | |
|---|---|---|---|---|
| 3,404,877 A | * | 10/1968 | Darnell ........................ | 267/137 |
| 5,173,578 A | * | 12/1992 | Tama .......................... | 267/179 |
| 5,246,215 A | * | 9/1993 | Takamura et al. .......... | 267/179 |

FOREIGN PATENT DOCUMENTS

JP          0539955    *  5/1993    ................. 267/179

* cited by examiner

*Primary Examiner*—Christopher P. Schwartz

(57) ABSTRACT

This invention is a shock absorber for a oil well pumping unit. When a oil well is being produced by means of a oil well pumping unit-the pumping unit sits on the ground surface and pumps in an upward and downward motion which works the sucker rod string that runs down the well bore with a oil pump attached to the bottom of the sucker rod string. The sucker rods are attached to the pumping unit by means of a polish rod. The polish rod is the top rod of the sucker rod string. This shock absorber fits over the polish rod and slides down to a desired position. It is attached to the pumping unit by either wire line clamps on the bridle arms or a carrier bar. It will fit any and all oil well pumping units. Other oil well shock absorbers will only fit oil well pumping units with special attachments. This shock absorber is to eliminate pounding and vibration from the pumping unit and sucker rod string. When pounding and vibration occurs this damages the pumping unit and sucker rod string, which causes down time and lost revenue.

4 Claims, 1 Drawing Sheet

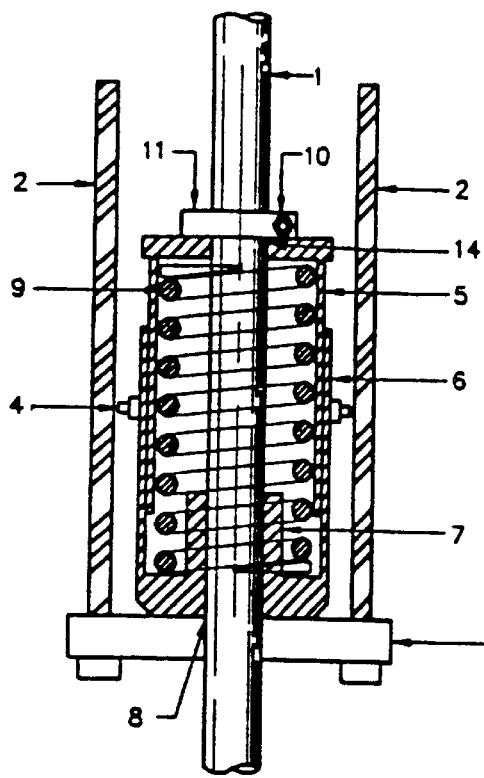
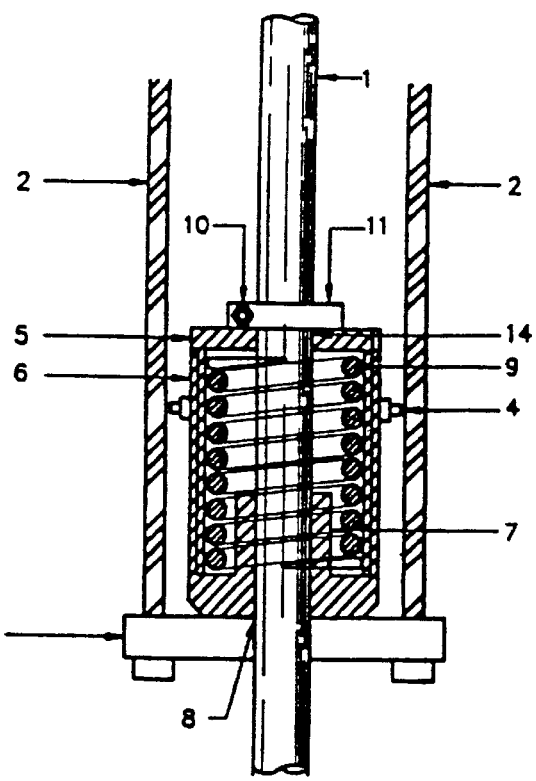
Figure 1
Figure 2
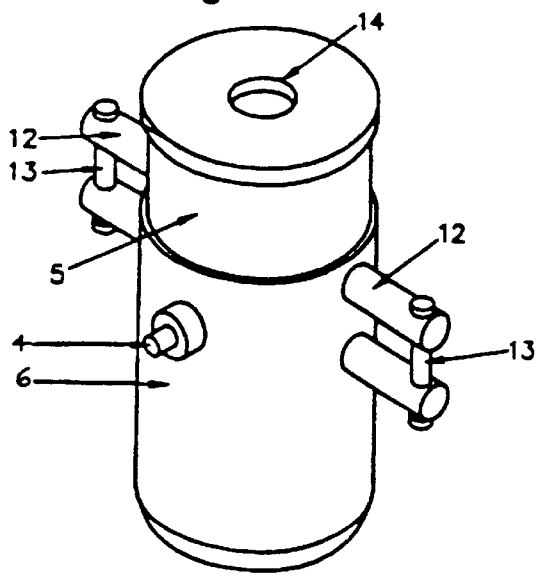
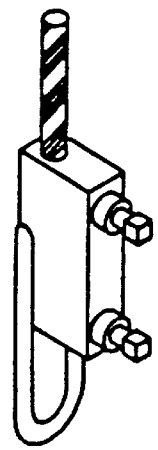
Figure 3
Figure 4

POLISH ROD SPRING II

SUMMARY OF THE INVENTION

This shock absorber is mounted between the cables or rod hangers of a beam and a polish rod. It is supported by one of two ways. 1. By the bridle arms which hooks up to the wire line clamps or 2. sitting on the carrier bar with a bolted clamp that fits over the polish rod and rests on top of the shock absorber.

The shock absorber is made up of two cylindrical members. The top one fits inside the bottom one with a single coil spring inside of cylindrical. The first cylindrical member positioned on the bridle arms or carrier bar has a polish rod opening on the bottom with and through the spring aligner and the second cylindrical member which slides inside of the first cylindrical member has a polish rod opening on top. The spring aligner is to keep the polish rod and spring centralized to reduce wear and shock absorber will operate smoothly. The single coil spring fits between the two cylindrical members with the polish rod running through coil spring. When the oil well pumping unit is in motion the coil spring is compressed in the upward and downward motion thus eliminating pounding and vibration from pumping unit and sucker rod string. When there is pounding fluid, broken sucker rod string, sanded up well or oil pump coming off rod string. This puts pounding and vibration stress on the entire pumping unit, damaging the gears in the gear box (main driving force), walking beam, polish rod, sucker rod string, and the oil pump that's attached to the sucker rod string. The down time and repair cost is very expensive.

DETAILED DESCRIPTION

Further features and advantages of this invention will appear from a detailed description of the drawings in which:

FIG. 1 is a front partial cross section view on a carrier bar.

FIG. 2 is a back partial cross section in compressed view on a carrier bar.

FIG. 3 is a perspective view of the invention.

FIG. 4 is a perspective view of a wire line clamp.

FIG. 1 is a front partial cross section view of the shock absorber on a 3 carrier bar. The shock absorber sits on a 3 carrier bar which is connected to the walking beam by 2 two hanger rods or 2 cables and the 5 cylindrical top section fits inside the 6 bottom cylindrical with the 9 coil spring inside the cylindrical with a 1 polish rod 8,14 opening on 14 top and 8 bottom of cylindrical. 11 clamps with 10 bolts sit on top of shock absorber to hold shock absorber in place on 1 polish rod. In the inside 6 bottom cylindrical is a vertical 7 spring aligner which keeps the 1 polish rod centralized and keeps the 9 spring away from the 1 polish rod which reduced wear and keeps the shock absorber functioning properly. On the outside of bottom 6 cylindrical is two 4 grease fittings for lubricating shock absorber. This also shows 1 polish rod running through the center of shock absorber with light compression on 9 coil spring. The top 5 cylindrical section slides upward and downward inside bottom 6 cylindrical.

FIG. 2 is a back partial cross section view of the shock absorber in a fully compressed position. Same as FIG. 1 but in a back view.

FIG. 3 is a perspective view of the invention. This is the shock absorber showing the 5 top cylindrical sliding inside of 6 bottom cylindrical with the 1 polish rod 14 opening on top of 5 top cylindrical. This shows the 12 bridle arms mounted on the outside of the 6 bottom cylindrical. There are 12 two bridle arms on each side of 6 outer cylindrical with a vertical 13 pin in each set of 12 bridle arms to keep FIG. 4 wire line clamps in position and FIG. 4 wire line clamps making it a shock absorber which needs no special attachments.

FIG. 4 is a perspective view of a wire line clamp that is already in use on oil well pumping units. This is the wire line clamp that will fit inside the 12 bridle arms.

What is claimed is:

1. A shock absorber for an oil well pumping unit, the pumping unit being the kind having a walking beam for imparting reciprocating motion to a rod string, where a bridle extends from the walking beam to the polish rod, the shock absorber comprising:

(a) a spring housing comprising:
        (i) a first cylindrical member;
        (ii) a second cylindrical member adapted such that a portion of the second member may be concentrically received by the first cylindrical member, the longitudinal axis of the first cylindrical member and the longitudinal axis of the second cylindrical member coinciding and defining a housing axis;
        (iii) a top having a first opening centered on the housing axis, the first opening adapted for the reciprocation of the polish rod;
        (iv) a bottom having a second opening centered on the housing axis, the second opening adapted for the reciprocation of the polish rod;
    (b) a spring aligner disposed inside the housing attached to the bottom, the spring aligner having an aligner opening centered on the housing axis, the aligner opening adapted for the reciprocation of the polish rod; and
    (c) a spring disposed inside the housing, the spring centered on the housing axis, the spring sliding over the springer aligner.

2. A shock absorber for an oil well pumping unit, the pumping unit being the kind having a walking beam for imparting reciprocating motion to a rod string, where a bridle extends from the walking beam to the polish rod, the shock absorber comprising:

(a) a spring housing comprising;
        (i) a first cylindrical member;
        (ii) a second cylindrical member adapted such that a portion of the second member may be concentrically received by the first cylindrical member, the longitudinal axis of the first cylindrical member and the longitudinal axis of the second cylindrical member coinciding and defining a housing axis;
        (iii) a top having a first opening centered on the housing axis, the first opening adapted for the reciprocation of the polish rod;
        (iv) a bottom having a second opening centered on the housing axis, the second opening adapted for the reciprocation of the polish rod;
    (b) a spring aligner disposed inside the housing attached to the bottom, the spring aligner having an aligner opening centered on the housing axis, the aligner opening adapted for the reciprocation of the polish rod;
    (c) a spring disposed inside the housing, the spring centered on the housing axis, the spring sliding over the spring aligner; and
    (d) means for attaching the housing to the bridle.

3. The shock absorber of claim 2, wherein the means for attaching the housing to the bridle comprises a plurality of bridle arms attached to the first cylindrical member, the bridle arms adapted to receive the bridle.

4. The shock absorber of claim 3, wherein the attachment means comprise a plurality of wireline clamps.

* * * * *